Figure 1:
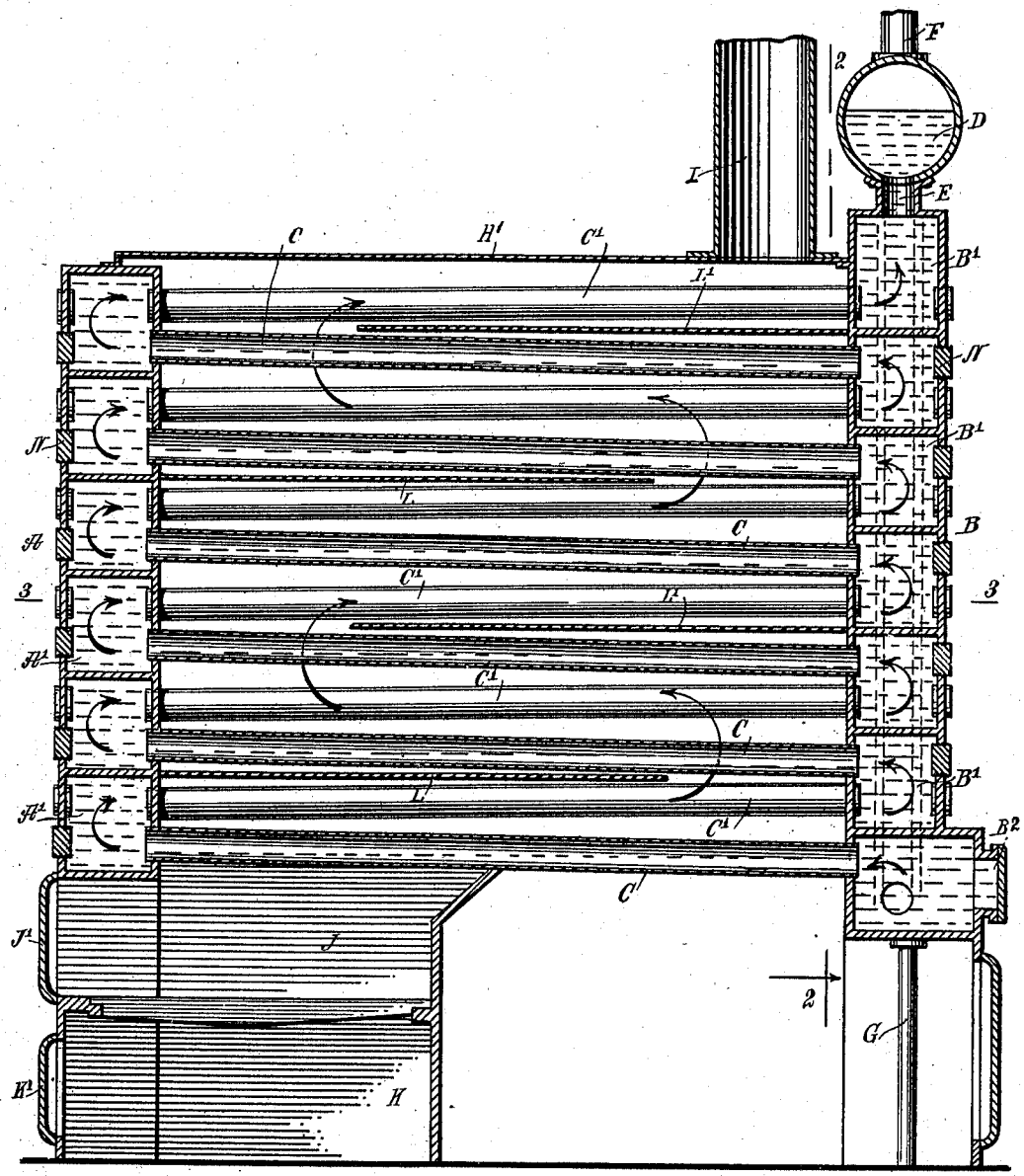

M. F. KENELY.
HOUSE HEATING BOILER.
APPLICATION FILED MAR. 18, 1910.

970,833.

Patented Sept. 20, 1910.

3 SHEETS—SHEET 1.

WITNESSES:

INVENTOR
Martin F. Kenely
BY
ATTORNEYS

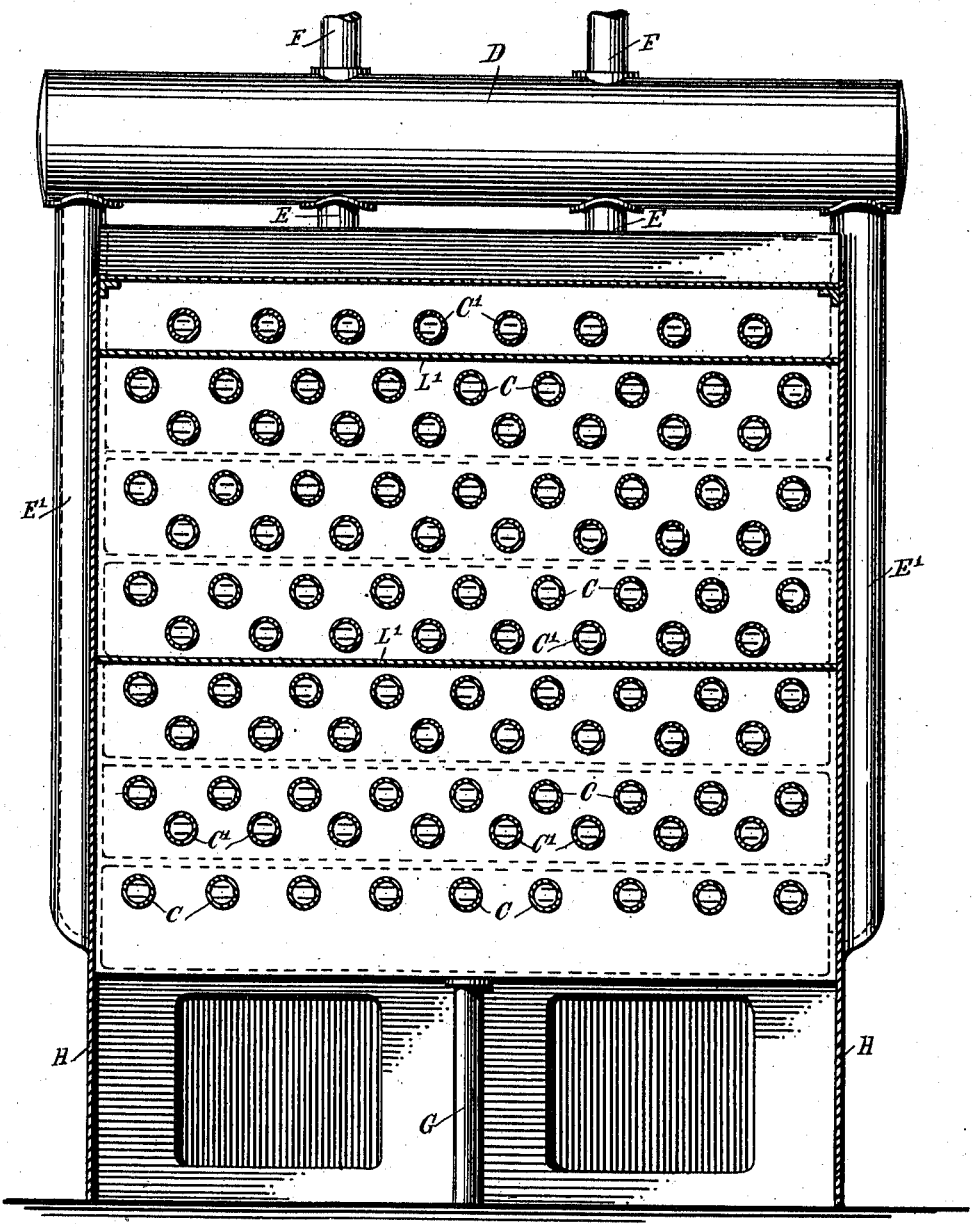

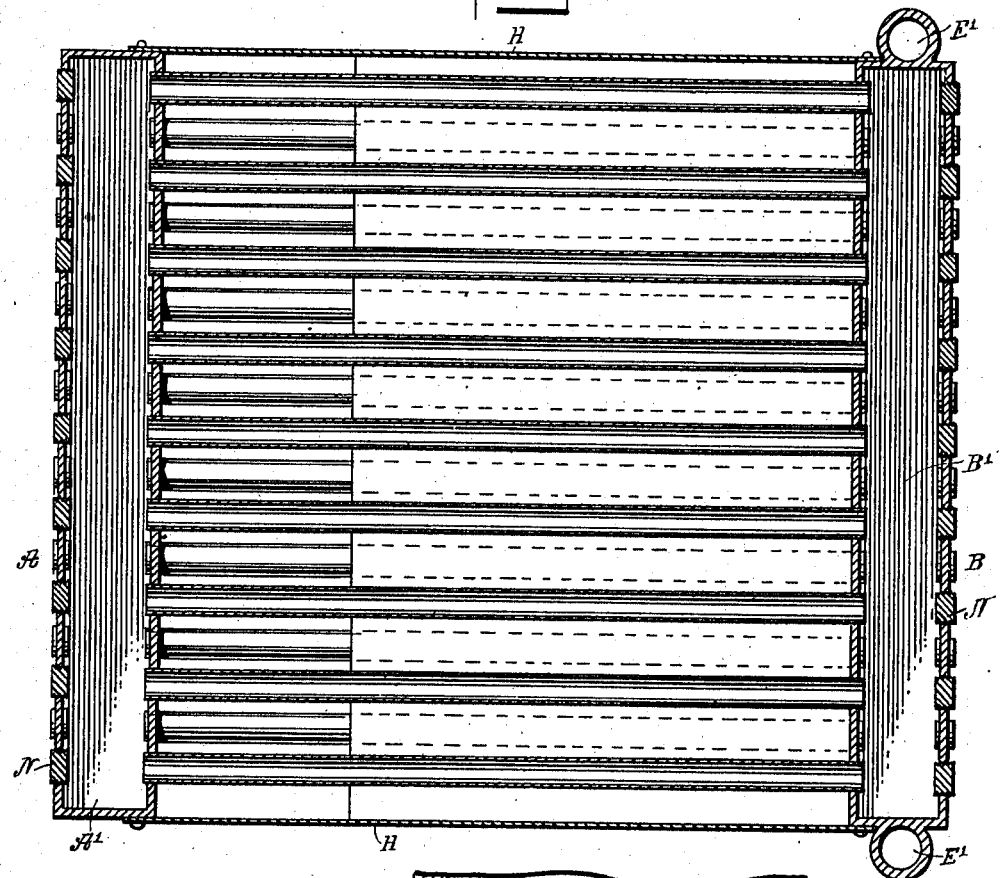
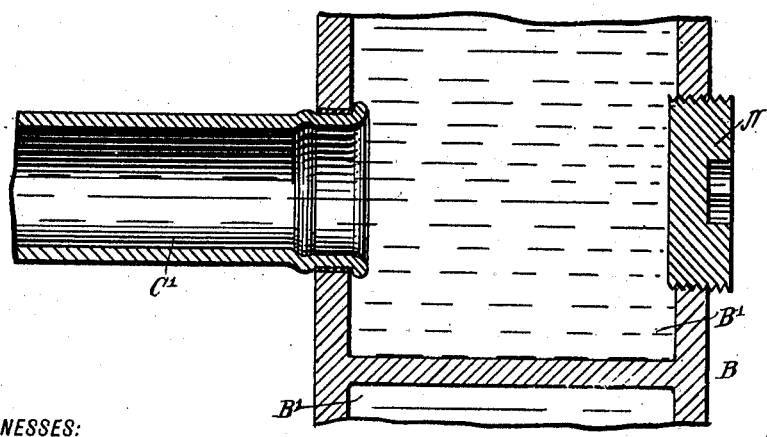

UNITED STATES PATENT OFFICE.

MARTIN F. KENELY, OF ELIZABETH, NEW JERSEY.

HOUSE-HEATING BOILER.

970,833.  Specification of Letters Patent.  Patented Sept. 20, 1910.

Application filed March 18, 1910. Serial No. 550,167.

*To all whom it may concern:*

Be it known that I, MARTIN F. KENELY, a citizen of the United States, and a resident of Elizabeth, in the county of Union and State of New Jersey, have invented a new and Improved House-Heating Boiler, of which the following is a full, clear, and exact description.

The object of the invention is to provide a new and improved boiler, more especially designed for use in houses for heating the same with steam or water, and arranged to utilize the fuel to the fullest advantage, to insure quick circulation of the water, and to permit convenient cleaning and making repairs.

For the purpose mentioned, use is made of front and rear water sections, each having separate water compartments, one above the other, and inclined water tubes connecting the water compartments in the front and rear water sections with one another, the water tubes being inclined in opposite directions to cause rapid travel of the water.

A practical embodiment of the invention is represented in the accompanying drawings forming a part of this specification, in which similar characters of reference indicate corresponding parts in all the views.

Figure 1 is a sectional side elevation of the boiler; Fig. 2 is a cross section of the same on the line 2—2 of Fig. 1; Fig. 3 is a sectional plan view of the same on the line 3—3 of Fig. 1; and Fig. 4 is an enlarged sectional side elevation of part of the rear water section and one of the tubes leading to a water compartment in the said section.

The boiler is provided with a front water section A, having separate water compartments A′, located one above the other, and the rear water section B is similarly constructed and provided with water compartments B′, located one above the other but staggered in height relative to the compartments A′, so that the lowermost water compartment B′ in the rear water section B is somewhat lower than the lowermost water compartment A′ in the front water section A, and so on, throughout the water compartments, as will be readily understood by reference to Fig. 1. The water compartments B′ of the rear water section B are connected by water tubes C with the corresponding water compartments A′ in the front water section A, and the said water tubes C are inclined forwardly and upwardly, as will be readily understood by reference to Fig. 1, so that the water can flow from a rear water compartment B′ through the corresponding tube C to the opposite water compartment A′ in the front water section A. Water tubes C′ connect the water compartments A′ of the front water section A with the water compartment B′ of the rear water section B, and the said water tubes C′ extend rearwardly and upwardly, so that the water readily flows from the front water compartment A′ to the next higher rear water compartment B′. As shown in Fig. 1, the tubes C lead approximately from near the upper ends of the rear water compartments B′, to discharge into the lower portions of the front water compartments A′, and the water tubes C′ lead from near the top of the front water compartments A′ and discharge into the lower portions of the rear water compartments B′. Now from the foregoing, it will be seen that the water readily circulates from the compartments of the rear water section B to the corresponding compartments of the front water section A, and from the latter back to the rear water compartments.

The uppermost water compartment B′ of the rear water section B is above the uppermost water compartment A′ of the front water section A, and above this uppermost water compartment B′ is arranged a drum D, connected with the upper compartment B′ by pipes E, and from the top of the drum D lead pipes F for conducting steam or water to the radiators in the different rooms of the house. The ends of the lowermost water compartment B′ and the ends of the drum D are connected with each other by circulating pipes E′, preferably formed on the rear water section B, made of single casting, the same as the front water section A. The water is preferably supplied to the lowermost water compartment B′ by a pipe G, as indicated in Figs. 1 and 2.

The sides of the front and rear water sections A and B are connected with each other by shell plates H, and a top shell plate H′ extends across the uppermost tube C′ and is connected with the front and rear water sections A and B, and from the said top plate H′ extends a pipe I for carrying off the products of combustion. A fire box J is located under the lowermost front water section A' and under the front portions of the lowermost water tube C, as plainly indicated in Fig. 1, and below the said fire box J is arranged an ash pit K, and the said fire box J and the ash pit K are provided with suitable doors for placing fuel in the fire box J and removing the ashes from the ash pit K. Baffle plates L and L' are disposed horizontally in the space between the front and rear water sections A and B, the baffle plates L extending rearwardly from the front water section A to within a distance of the rear water section B, and the baffle plates L' extend forwardly from the rear water section B to within a distance of the front water section A, so that the smoke and gases arising from the burning fuel in the fire box J pass in zigzag fashion around the water tubes C, C', to finally pass to the smoke stack I.

The outer walls of the front and rear water sections A and B are provided with cleaning-out plugs N, opposite the corresponding water tubes C and C', to permit convenient access to the said tubes for cleaning the same or for placing new tubes in position in case one is worn out.

The boiler shown and described is very simple and durable in construction, can be cheaply manufactured, and by the arrangement of the inclined water tubes C, C' and the particularly arranged water compartments A' and B', a rapid circulation of the water is established, aided by the connection of the outside pipes E' connecting the drum D with the lowermost water compartment B'.

Having thus described my invention, I claim as new and desire to secure by Letters Patent:

A boiler comprising front and rear water sections, each section consisting of a plurality of superposed compartments, the compartments of one of the sections being staggered with respect to the compartments of the other section, a water drum above the rear section and delivering to the lowermost compartments of the said section, inclined water tubes connecting each compartment of each section with the next lowest compartment of the other section, a connection between the upper-most compartment and the water drum, baffle plates extending horizontally and alternately from the front and rear water sections, and a fire box under the front water section and the front portion of the lower-most water tubes.

In testimony whereof I have signed my name to this specification in the presence of two subscribing witnesses.

MARTIN F. KENELY.

Witnesses:
FRANK J. PFAFF,
EDWARD NUGENT.